US008737550B1

(12) United States Patent
Jonsson et al.

(10) Patent No.: US 8,737,550 B1
(45) Date of Patent: May 27, 2014

(54) ESTIMATING OPTIMAL LINEAR REGRESSION FILTER LENGTH FOR CHANNEL ESTIMATION

(71) Applicant: Telefonaktiebolaget LM Ericsson (publ), Stockholm (SE)

(72) Inventors: Elias Jonsson, Malmö (SE); Andres Reial, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/693,561

(22) Filed: Dec. 4, 2012

(51) Int. Cl.
*H04B 1/10* (2006.01)
(52) U.S. Cl.
USPC .......................................................... 375/350
(58) Field of Classification Search
CPC .................................................... H04L 25/022
USPC ............................................................ 375/350
See application file for complete search history.

(56) References Cited

U.S. PATENT DOCUMENTS

| | | | |
|---|---|---|---|
| 5,818,876 A | 10/1998 | Love | |
| 7,161,896 B1 | 1/2007 | Hart et al. | |
| 7,821,915 B2 | 10/2010 | Hart et al. | |
| 8,073,393 B2 * | 12/2011 | Yu et al. | 455/67.11 |
| 8,095,076 B2 * | 1/2012 | Aedudodla et al. | 455/67.13 |
| 8,385,478 B1 * | 2/2013 | Liu et al. | 375/340 |
| 2002/0065047 A1 * | 5/2002 | Moose | 455/63 |
| 2004/0240376 A1 * | 12/2004 | Wang et al. | 370/204 |
| 2005/0163258 A1 * | 7/2005 | Gore et al. | 375/340 |
| 2005/0243791 A1 * | 11/2005 | Park et al. | 370/343 |
| 2006/0203932 A1 * | 9/2006 | Palanki et al. | 375/295 |
| 2006/0222094 A1 * | 10/2006 | Makhlouf et al. | 375/260 |
| 2006/0227887 A1 | 10/2006 | Li et al. | |
| 2011/0026619 A1 | 2/2011 | Kent et al. | |

FOREIGN PATENT DOCUMENTS

| | | |
|---|---|---|
| CN | 101800617 A | 8/2010 |
| EP | 1047232 A2 | 10/2000 |
| WO | 0011798 A1 | 3/2000 |

OTHER PUBLICATIONS

Reial, A. et al. "Adaptive Smoothing of Channel Estimates." Pending U.S. Appl. No. 13/630,194, filed Sep. 28, 2012.

* cited by examiner

*Primary Examiner* — Juan A Torres
(74) *Attorney, Agent, or Firm* — Murphy, Bilak & Homiller, PLLC (57) ABSTRACT

Techniques for obtaining smoothed channel response estimates in a communications receiver. An example method begins with obtaining ordered channel measurement samples for a current estimation interval and continues with the estimation of a short-term slope value for each of several sequential observation time intervals. A distortion metric is calculated for each of a plurality of candidate filter lengths, where each candidate filter length is an integer multiple of the uniform length. The distortion metric is based on the short-term slope values for observation time intervals falling within the candidate filter length, and characterizes the extent to which the candidate filter length will introduce tracking bias in subsequent signal processing. A filter length is then selected for use in demodulating a received signal from at least among the candidate filter lengths, based on the distortion metric values.

27 Claims, 4 Drawing Sheets

ESTIMATING OPTIMAL LINEAR REGRESSION FILTER LENGTH FOR CHANNEL ESTIMATION

RELATED APPLICATIONS

This application is related to U.S. patent application Ser. No. 13/630,194, titled "Adaptive Smoothing of Channel Estimates" and filed 28 Sep. 2012, the entire contents of which are incorporated herein by reference.

TECHNICAL FIELD

The present application is generally related to communication receivers, and is more particularly related to techniques for obtaining communication channel estimates for use in signal processing.

BACKGROUND

A communications receiver typically needs to know the response of the communications channel, i.e., the response of the link between a remote transmitter and the receiver. This is especially the case in wireless communications receivers, which generally must cope with interference, multipath scattering, and fading of the transmitted signal, in addition to the reduced signal strength that arises from the distance between the transmitter and receiver. In many systems, the receiver performs frequent estimates of the channel response, since the channel response can change over time.

In the Wideband Code-Division Multiple Access (W-CDMA) systems standardized by members of the 3rd-Generation Partnership Project (3GPP), for example, estimates of the channel response, hereinafter called "channel estimates," are derived from instantaneous channel measurements, which may in turn be obtained from the received and despread version of the Common Pilot Channel (CPICH) to CPICH symbols that are known to have been transmitted by the remote base station (frequently referred to as a "Node B" in 3GPP documentation). As discussed in further detail below, channel response estimates are often improved by smoothing of these channel measurements, e.g., by filtering several measurements corresponding to multiple measurement times, across one or more slots.

The initial channel measurements used for calculating channel response estimates may be available for different update time intervals, such as a symbol or a slot. They may correspond to specific path delays, e.g. in a DS-CDMA-based system like WCDMA/HSPA, and/or to specific signal frequencies or frequency bins, e.g., to specific sub-carriers in an Orthogonal Frequency-Division Multiplexing (OFDM) signal, such as those used in the so-called Long-Term Evolution (LTE) systems standardized by 3GPP. It should be appreciated that the channel transfer response will generally vary with frequency as well as with time, for wideband systems. Accordingly, channel estimation techniques may need to account for time-variation, frequency-variation, or both, in various systems.

As WCDMA and LTE systems evolve, it becomes increasingly important to build advanced receiver structures for both the mobile terminals (known as "user equipment" or "UEs" in 3GPP terminology) as well as the base stations. Such advanced receivers may be characterized, for example, by an ability to cancel known interferers, such as control channels, or in some cases to cancel downlink data transmissions to other UEs or uplink transmissions from other UEs. A necessary ingredient in such receivers is good channel estimates. Without good channel estimates, the cancellation of interfering signals may degrade the resulting signal quality, instead of improving it.

The initial channel measurements are typically filtered, i.e., "smoothed," in order to obtain improved channel estimates. This smoothing may be done by averaging the measurements, performing linear regression with the channel measurements as suggested above, or by using another suitable linear filter. One well-performing and conceptually simple approach is to apply linear regression to the initial channel estimates from the recent past and to model the fading channel coefficient trajectory with slope and offset parameters. A straight line approximation of a fading channel often results in an adequate approximation for channel estimation purposes. More elaborate approximations of the fading pattern could be done, but that requires more statistical information about the fading realization that may not be readily available. Any of these techniques can be regarded as applying a filter response to the channel measurements, the filter response having a particular time constant and filter bandwidth.

Motion of the receiver or transmitter affects the time-varying nature of the channel response, as changes in the receiver or transmitter positions affect at least the multipath and fading characteristics of the channel. This problem is especially pronounced for high-velocity situations, such as when the receiver is in or attached to a vehicle. A faster rate of change in the channel response means that shorter filter times, i.e., larger filter bandwidths, must be used to avoid excessive biasing of the resulting channel estimates. Accordingly, in some cases, the filter bandwidth and/or other filter parameters used to obtain channel estimates may depend on the maximum Doppler shift and/or the noise power level. This allows the smoothing filter to be adapted to the velocity of the receiver or transmitter, while also taking account of the noise power level in some implementations. It is then possible to use more filtering at low velocities and less filtering at high velocities, for example. It is similarly possible to use more filtering when the noise power level is high and less filtering when the noise power level is low.

Generally, the optimal filtering solution is a trade-off between noise suppression and the estimation bias incurred due to errors in channel tracking. Channel estimation techniques need additional improvements to approach the optimal filtering solution over the wide variety of signal conditions and speeds likely to be encountered by a typical receiver.

SUMMARY

Various embodiments of the present invention are based on techniques that directly adapt the parameters of a smoothing filter used for channel estimation to the current velocity and signal-to-noise ratio (SNR) situation. In situations where receiver mobility is a concern, for example, these embodiments can advantageously perform fast filter adaptation without requiring either an estimate of the Doppler spread of the received signal or an estimate of the received noise. Generally speaking, the most accurate channel response estimates can be obtained by applying as much filtering as possible in each situation, without introducing an excessive degree of tracking bias.

According to one aspect, several methods for obtaining smoothed channel response estimates in a communications receiver are disclosed. An example method begins with performing a plurality of channel response measurements corresponding to a path delay or to a signal frequency/frequency bin, to obtain ordered channel measurement samples for a current estimation interval. The method continues with the estimation of a short-term slope value for each of a plurality of sequential observation time intervals. Each observation time interval comprises a series of the ordered channel measurement samples, having a uniform length. Next, a distortion metric is calculated for each of a plurality of candidate filter lengths, where each candidate filter length is an integer multiple of the uniform length. In other words, each candidate filter length is made up of an integer number of consecutive observation time intervals. The calculation of the distortion metric is based on the short-term slope values for observation time intervals falling within the candidate filter length, and characterizes an extent to which the candidate filter length will introduce a tracking bias in filtering the ordered channel measurement samples. A filter length is then selected for use in demodulating a received signal from at least among the candidate filter lengths, based on the distortion metric values. In short, the longest filter length meeting a pre-determined distortion criterion is selected.

In some embodiments, the filter length is selected from among the candidate filter lengths and a default filter length (e.g., a filter length corresponding to $N_{ref}$ samples, as described above), the default filter length being shorter than any of the candidate filter lengths. In some embodiments, the computation of the distortion metric value for each candidate filter length may comprise determining minimum and maximum slope values among the short-term slope values for observation time intervals falling within the candidate filter length and normalizing a difference between the minimum and maximum slope values. In other embodiments, the computation of the distortion metric value for each candidate filter length may instead comprise calculating a variance over the short-term slope values for observation time intervals falling within the candidate filter length.

In some embodiments, multiple distortion metric values for each candidate filter length are filtered, to obtain filtered distortion metric values, in which case the selection of the filter length for use in demodulating the received signal is based on the filtered distortion metric values. In any of the embodiments described above, each of the performing, estimating, computing, and selecting operations may be repeated for each of a series of channel estimation intervals, so that the selected filter is adapted in response to changing channel conditions. In several embodiments, the ordered channel measurement samples are time-ordered channel measurement samples taken over an interval of time. In others, the ordered channel measurement samples are frequency-ordered channel measurement samples taken across a set of sub-carrier frequencies.

According to another aspect, communications receiver circuits configured to carry out one or more of the methods described above are disclosed. An example communications receiver circuit includes a channel response measurement circuit, which is configured to perform a plurality of channel response measurements corresponding to a path delay or to a signal frequency, to obtain ordered channel measurement samples for a current estimation interval, and further includes a processing circuit, which is configured to receive the channel measurements from measurement circuit and to evaluate them according to one or more of the techniques described above to select a smoothing filter response for generating smoothed channel response estimates. Accordingly, the processing circuit in some embodiments is configured to: estimate a short-term slope value for each of a plurality of sequential observation time intervals, each observation time interval comprising a plurality of the ordered channel measurement samples and having a uniform length; for each of a plurality of candidate filter lengths, where each candidate filter length is an integer multiple of the uniform length, compute a distortion metric value based on the short-term slope values for observation time intervals falling within the candidate filter length, the distortion metric value characterizing an extent to which the candidate filter length will introduce a tracking bias in filtering the ordered channel measurement samples; and select a filter length for use in demodulating a received signal from at least among the candidate filter lengths, based on the distortion metric values, such that the longest filter length meeting a pre-determined distortion criterion is selected. Wireless devices that include such a receiver circuit are also disclosed.

The methods, circuits and devices summarized above may be used to provide improved channel response smoothing and enhanced receiver performance. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention is described more fully hereinafter with reference to the accompanying drawings, in which examples of embodiments of the invention are shown. The methods, circuits and devices of this disclosure may, however, be embodied in many different forms and should not be construed as limited to the embodiments set forth herein. It should also be noted that these embodiments are not mutually exclusive. Thus, components or features from one embodiment may be assumed to be present or used in another embodiment where such inclusion is suitable.

For purposes of illustration and explanation only, these and other embodiments are described herein in the context of operating in a radio access network (RAN) that communicates over radio communication channels with wireless terminals (also referred to as user equipment, or "UEs"). The embodiments are applicable to communications systems based on any of TDMA, CDMA, FDMA, or OFDM radio access technologies in general. More particularly, specific embodiments are described in the context of systems using W-CDMA and/or High-Speed Packet Access (HSPA) technologies, as standardized by the membership of the 3rd-Generation Partnership Project (3GPP). It will be understood, however, that the present disclosure is not limited to such embodiments and may be embodied generally in various types of communication networks, including, for example, the so-called Long-Term Evolution (LTE) networks also standardized by 3GPP.

As used herein, the terms mobile terminal, wireless terminal, wireless device or UE can refer to any device that receives data from a communication network, and may include, but are not limited to, a mobile telephone ("cellular" telephone), laptop/portable computer, pocket computer, hand-held computer, modem and/or desktop computer. These terms could also refer to machine-to-machine type communication devices, used without direct human interaction. One example of such device would be a sensor.

Also note that the use of terminology such as "base station" (which may be referred to in various contexts as a NodeB, for example) and "wireless terminal," "mobile terminal," or "wireless device" (often referred to as a "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel.

Likewise, the terms "transmitting node" and "receiving node" may be used herein to distinguish one device from another, with the "transmitting" and "receiving" designations used only to indicate which device is at which end of a particular transmission or transmissions of interest. Again, the use of these terms does not necessarily imply a certain hierarchical relation between two particular nodes of a communication link. It should be appreciated, of course, that a "transmitting node" may often (and may generally) include receiving hardware, just as a "receiving node" may be adapted to transmit signals as well. While embodiments discussed herein may focus on wireless transmissions in a downlink from a base station (a Node B, in 3GPP specifications for W-CDMA, for example) to a UE, the inventive techniques may also be applied, for example, to uplink transmissions in some contexts. As a result, several embodiments of the invention described in detail below may be suitable for use in various wireless terminals, base stations, or both.

It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

For simplicity, the discussion that follows generally focuses on the estimation of a single channel coefficient, to represent the channel estimate for a given time interval. It will be appreciated that this can be easily extended to channel response estimates represented by several coefficients, e.g., for each of several path delays, or for each of several frequencies. For instance, the techniques described below can simply be performed separately for each coefficient, using channel measurements corresponding to the delay and/or frequency for the coefficient. Upon reading the detailed description below, those skilled in the art will appreciate that other approaches may also be used.

Also of note is that the terms "filter length," "filter time," and "filter bandwidth" are used frequently in the following discussion to refer to the transfer response of the filter applied to channel measurements. Those skilled in the art will appreciate that these terms are closely related, and in some cases may be used interchangeably. More precisely, the term "filter time" refers to a time constant for the filter. While any of several particular definitions of a filter time constant are possible, the "filter time" refers to an interval of time, e.g., a time "window," over which channel response measurements (inputs to the filter) have an effect on a channel response estimate for a particular time or interval. It is well known that the filter time is inversely proportional to the "filter bandwidth." Again, any of several particular definitions for filter bandwidth are possible, but all generally refer to the possible time-variability in the filter output, i.e., in the channel estimate. A given filter bandwidth means that significant variations in the channel estimates at frequencies outside the filter bandwidth will not be seen. Finally, the term "filter length" may sometimes refer to the number of channel response measurements that fall within the filter time, or may refer to the filter time itself. It should be further appreciated that the use of a filter is not limited to filtering time series; thus, the filter length may refer to the number of input samples that affect a particular filter output coefficient. Because of the close relationship between these terms, statements regarding any one of these terms in the following discussion should be understood to apply in a corresponding sense to the others, unless the context clearly indicates otherwise. Thus, for example, a statement regarding the effects of a relatively short filter time should also be understood to apply to a relatively wide filter bandwidth, and vice versa.

Several previously known techniques for channel estimation involve the adaptation of the filter response used to smooth channel measurements. Some of these known techniques require knowledge of the maximum Doppler shift and the noise power level of the channel measurements, e.g., as characterized by a signal-to-noise ratio (SNR) or signal-to-interference-plus-noise ratio (SINR). An example of such a solution is discussed in published patent application US 2006/0227887. The SNR or SINR is relatively fast and easy to estimate. However, the maximum Doppler shift, on the other hand, is more difficult to estimate, since doing so requires long estimation times. For instance, assume that the needed estimation time is ten periods of the maximum Doppler shift. In this case, the estimation time becomes almost two seconds, given relative receiver motion at three kilometers/hour and operation in the 2.1 GHz frequency band.

Another fundamental problem is the need to identify measurement variations that are caused by the channel, in contrast to the measurement variations that are caused by noise. This requires some prior knowledge of or assumptions regarding the signal-to-noise ratio and the maximum Doppler shift to be estimated. Other difficulties include frequency offsets between the transmitter and receiver that arise for reasons other than relative motion between the devices. These difficulties implicate the Automatic Frequency Control (AFC) and Automatic Gain Control (AGC) functions of the receiver.

One possible approach is to use each of several different smoothing filters, each having its own filter length/bandwidth, to produce several different channel response estimates for each observation interval. These distinct channel response estimates can then be used separately to demodulate the received signal and to obtain demodulated data symbols from the received signal. The SINR for each of the data symbols output in this manner can then be computed, and the output/smoothing filter corresponding to the best SINR selected. Such a solution is described in issued U.S. Pat. No. 7,821,915 B1. However, this approach requires the implementation of full demodulation chains for each of several smoothing filter responses, which can result in a significant increase in receiver complexity.

Various ones of these and other known techniques for channel estimation rely on adaptive methods such as Kalman filtering or on methods that obtain system parameters using techniques such as Doppler estimation and SINR estimation.

For example, the linear regression window length may be determined based on the estimated Doppler spread (vehicular speed). The drawback with these methods is that the explicit parameter estimates may lack the precision needed for this particular application. For example, obtaining accurate Doppler estimates in low-speed scenarios is often challenging. There is thus a general need for a method to determine the largest number of samples that can be approximated with a straight line, to enable robust linear regression without resorting to explicit Doppler estimation.

In U.S. patent application Ser. No. 13/630,194, titled "Adaptive Smoothing of Channel Estimates" and filed 28 Sep. 2012 (hereinafter "the '194 application"), the present inventors disclosed a method for choosing a channel estimation filter response (filter length/bandwidth), providing a desired trade-off between noise suppression and tracking bias but without requiring explicit SINR and Doppler estimates. For optimal filtering performance, the general goal is to maximize noise suppression by making the filtering time as long as possible, while avoiding a significant channel tracking bias, i.e., the estimation bias incurred due to errors in the channel tracking. The technique disclosed in the '194 application determines the longest linear regression span that results in an acceptably low modeling error, i.e. tracking bias, thus maximizing the filtering time as desired. However, the particular approach described in the '194 application may require increased processing complexity or raise stability issues in some contexts, since the approach requires a bank of several filters or control system principles to choose and adapt the filtering response.

Another approach, according to embodiments detailed below, is to adapt the smoothing filter by choosing from among several possible regression filter lengths based on distortion metrics computed for each of the candidate lengths. As detailed below, the distortion metric for each length is calculated from slopes obtained from best-fit lines for several groups of samples, the several groups of samples together having a length equal to the candidate regression filter length.

As can be seen from the detailed description of this approach that follows, this technique does not require an explicit Doppler estimate or an estimate of the received noise to select a regression filter length. Advantageously, a system implemented according to these techniques filters as heavily as it can (i.e., using the largest possible bandwidth) without introducing an unacceptable degree of bias. The occurrence of an unacceptable degree of bias is indicated when the distortion metric for a given candidate filter length fails to meet a pre-determined distortion criterion, such as exceeding a pre-determined threshold value.

Below, two related methods are described for estimating the longest permissible length of a linear regression filter for use in channel estimation. Both methods rely on the same underlying concept, where the slopes of small, linear, adjacent segments are evaluated using an aggregate metric function. Depending on the magnitude of the metric functions for a set of segments, the technique determines whether or not the collective set of samples corresponding to the segments can be well approximated with a straight line. The longest set that yields a good approximation is used for linear regression.

In the discussion that follows, a sample is defined as, for example, one CPICH symbol in WCDMA or one common reference symbol (CRS) resource element in LTE. Other channel samples may be used, however. Note also that while the example implementations described below are carried out in the time domain, the underlying techniques are agnostic to the estimation domain—the samples could span the frequency domain or the time domain.

Method I: Studying Maximum and Minimum Slope Ratios

With this approach, a best-fit straight line $\beta+\alpha_n t$ is fitted to the most recent $N_{samples}$ samples and a slope $\alpha_n$ for the line is computed for each of a plurality of sequential observation time intervals, where n is a time index. That is, each set of $N_{samples}$ samples constitutes an observation time interval. For each of several adjacent ones of these observation time intervals, i.e., every $N_{samples}$ samples, a new slope value is computed. This is done for each path/finger (WCDMA) or for each resource element/OFDM symbol (LTE) used to produce a channel estimate. The determination of the "best-fit" line can be done using a least squares estimation approach, for example, although other criteria for obtaining the best-fit line for the ordered channel samples may be used.

Next, for each time index n, corresponding to a new set of $N_{samples}$ ordered samples, maximum and minimum real and imaginary slope values are determined over sets of $N_l$ samples, where l=1 ... L. Here, $N_l$ is a candidate filter length, which indicates the length of the prospective regression filter candidate l to be used for channel estimation. A linear regression filter of length $N_l$ covers $N_l/N_{samples}$ slope evaluation intervals and short-term slope values $\alpha_n$.

Let $\alpha_l^{re,max}$ be the maximum value of the real part of the slopes $\alpha_n$, each over length $N_{samples}$ samples. Similarly define $\alpha_l^{im,max}$, $\alpha_l^{re,min}$, and $\alpha_l^{im,min}$ as the maximum value for the imaginary part of the slopes, the minimum value for the real part of the slopes, and the minimum value for the imaginary part of the slopes, respectively.

For each of several possible regression filter lengths $N_l$, a ratio $\rho_{l,raw}^{(max/min)}$ is computed, normalizing a difference between the maximum and minimum slope values, as follows:

$$\rho_{l,raw}^{(max/min)} = \frac{\alpha_l^{re,max} - \alpha_l^{re,min} + \alpha_l^{im,max} - \alpha_l^{im,min}}{\max(|\alpha_l^{re,max}|, |\alpha_l^{re,min}|) + \max(|\alpha_l^{im,max}|, |\alpha_l^{im,min}|)}$$

It should be appreciated that alternative formulations capturing the normalized range of slope values may also be devised.

For each of the possible filter lengths, the ratios $\rho_{l,raw}^{(max,min)}$ are filtered, e.g., using a moving average or median filter. A median filter is recommended since it removes outliers. The filtered ratios, denoted $\rho_l^{(max/min)}$, are distortion metrics that each characterize an extent to which the corresponding candidate filter length will introduce a tracking bias in filtering the ordered channel measurement samples. In other words, if the ordered samples corresponding to a given filter length can truly be represented with a straight line then the distortion metric for that filter length will not be very large.

For the min/max metrics described above, the intuitive explanation for why these are good metrics is that if the propagation channel can truly be approximated by a straight line then the difference between the max/min values of the line segments encompassing the interpolation interval will be very small. A reference filter length N_ref may be used to calibrate for what the natural variation in the max/min ratio will be when the selected span can actually be approximated with a straight line.

The distortion metrics for the candidate filter lengths are used to select a filter length for subsequent use, e.g., for demodulating the received signal. This selection is performed in such a manner that the longest filter length meeting a pre-determined distortion criterion is selected. For example, the pre-determined distortion can be that the distortion metric must be less than a pre-determined threshold value. This threshold value may in turn be a scaled version of the distortion metric for a short reference filter length.

For example, given the distortion metrics $\rho_l^{(max/min)}$, the largest (longest) filter having $\rho_l^{(max/min)} \leq \tau^{(max/min)} \cdot \rho_{N_{ref}}^{(max/min)}$ is selected and used for linear regression, to obtain improved channel estimates. Here, the distortion metrics for the various candidate regression filters are compared to a scaled version, scaled by a scaling parameter $\tau^{(max/min)}$, of the distortion metric corresponding to a predetermined regression model length $N_{ref}$, which is typically a low value (i.e., a short filter). If no filter $N_l$ is below the threshold, then the regression line corresponding to $N_{ref}$ samples is used. The method works well as long as $N_{ref}$ samples for the linear regression are never too many samples for generating the smoothed channel estimates.

Parameter values used in the pre-determined distortion criterion above, especially the scaling parameter $\tau^{(max/min)}$, for example, may also be adapted in response to current conditions, such as the channel dispersion, the SINR of the initial channel estimates, etc. For instance, higher values of the scaling parameter $\tau^{(max/min)}$ could be used to produce a higher distortion metric threshold for lightly dispersive channels in HSPA, or for noisier initial estimates.

Parameter Values:

Optimal values for all of the parameters above may be determined off-line, e.g., through simulations. A possible set of values may be $N_{samples}=15$, with $N_l \in \{30,60,120,240\}$. A filter covering 2000 samples may be used to filter $\rho_{l,raw}^{(max/min)}$, to obtain the filtered distortion metric $\rho_l^{(max/min)}$ for each candidate filter length. The filter selection may be performed using values $N_{ref}=30$ and $\tau^{(max/min)}=1.7$. Of course, other values may also be chosen.

Method II: Studying Variance of Slope Ratios

This related approach differs from the first approach discussed above primarily in the choice of the distortion metric function. Again, the technique begins with the fitting of a best-fit straight line $\beta + \alpha_n t$ to the most recent $N_{samples}$ samples to obtain the slope $\alpha_n$. Again, this is performed for each of a plurality of observation time intervals, each of the observation time interval comprising $N_{samples}$ ordered channel measurement samples. Thus, every $N_{samples}$ samples, a variance $\sigma_{l,raw}^2$ is computed, over the slopes that make up the regression length $N_l$ samples, where $l=1 \ldots L$. The variance values are then filtered, using a moving average or median filter, to obtain a filtered distortion metric $\sigma_l^2$. Again, a median filter is recommended, since it removes outliers.

The principle underlying this formulation of the distortion metric is that if the samples can truly be represented with a straight line then the variance of the slopes of segments of that line will not be very large.

The distortion metrics $\sigma_l^2$ are then used to select a filter length, based on a predetermined distortion criterion. Again, the distortion criterion can be a requirement that the distortion metric for a candidate filter length does not exceed a threshold value, such as a threshold value obtained by scaling a reference distortion metric value. In the present example, then, given the distortion metrics $\sigma_l^2$, the largest (longest) filter having $\sigma_l \leq \tau^{(var)} \cdot \sigma_{N_{ref}}$ is selected and used for linear regression, to obtain improved channel estimates. As before, the distortion metrics for the various candidate regression filters are compared to a scaled version of the distortion metric that corresponds to a predetermined regression model length $N_{ref}$, which is typically a low value (i.e., a short filter). If no filter $N_l$ is below this threshold, then the regression line corresponding to $N_{ref}$ samples is used. The method works well as long as $N_{ref}$ samples for the linear regression are never too many samples for generating the smoothed channel estimates. Again, the pre-determined distortion criterion may be adapted, depending on current conditions. For example, the threshold value $\tau^{(var)}$ used in the criterion described above may depend, for example, on a geometry value for the received signal and the initial channel estimate SINR.

Most of the parameter values quoted in the previous section may also be used in this approach. In simulations, the scaling value $\tau^{(var)}=1.5$ has been shown to be a good default value, given a reference filter length of $N_{ref}=30$.

In general, either of the techniques described above, or variants thereof, may be applied separately to each delay in WCDMA/HSPA or to each resource element (RE) in LTE. In some implementations, it may suffice to do the regression line length calculations for a delay that corresponds to the largest peak in the channel delay response, as well as for that delay's quarter-chip neighbor delays. In these embodiments, the smallest filter length suggested by any of those three delays may be used as the regression filter length for all peaks.

Since the permissible linear regression window length generally indicates an allowed smoothing filter bandwidth, the techniques described herein may also be used to select filtering time parameters for other filter structures, such as time constants for exponential smoothing or window lengths for Finite Impulse Response (FIR) filtering.

Figure 1:
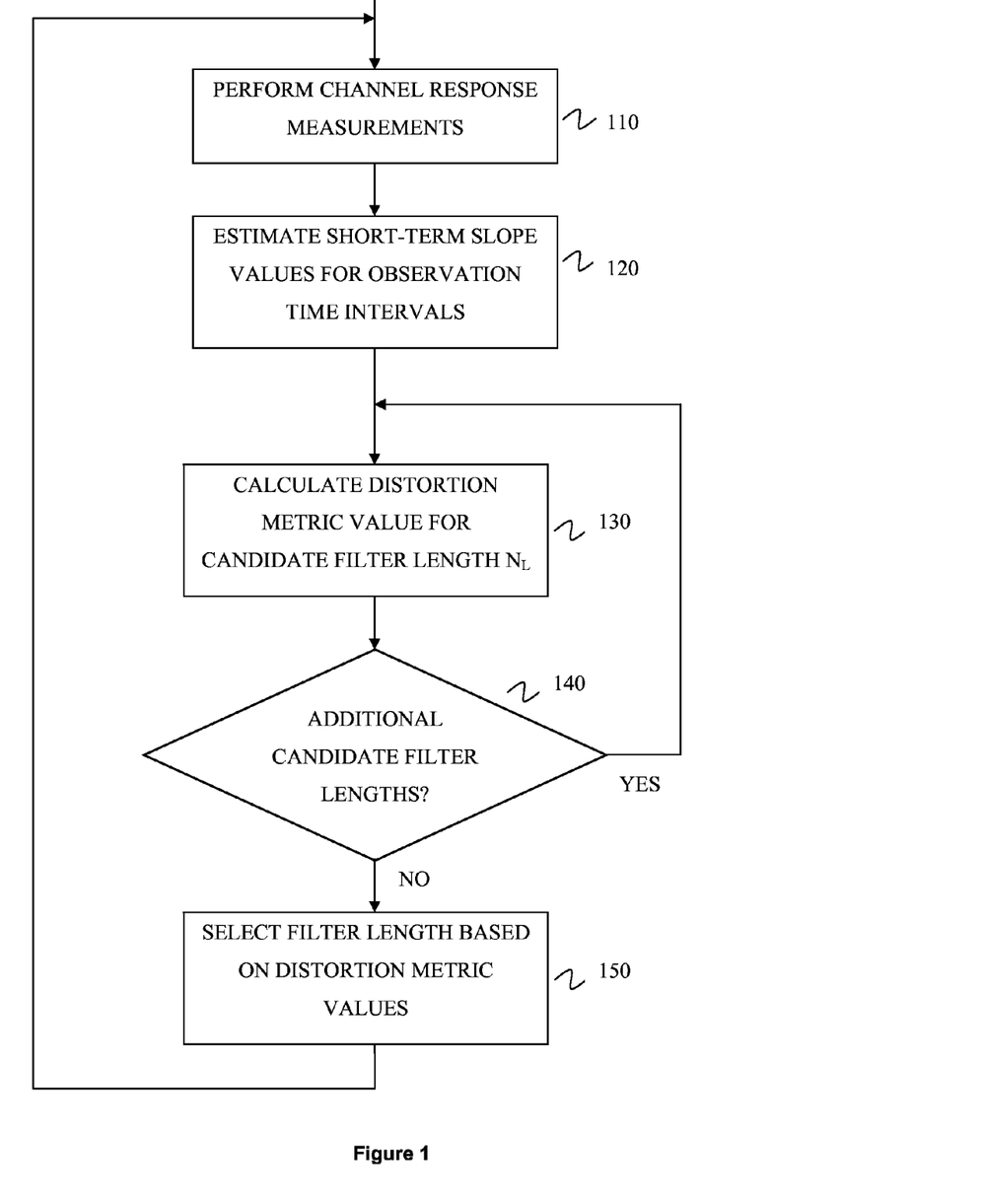
FIG. 1 is a process flow diagram illustrating an example method according to some embodiments of the invention.

Keeping the above detailed example implementations in mind, it should be appreciated that FIG. 1 illustrates a generalized method for obtaining smoothed channel response estimates according to the present invention. The illustrated method is suitable for implementation in a communications receiver, such as a mobile terminal or base station in a wireless communication system.

The illustrated method begins, as shown at block 110, with performing multiple channel response measurements corresponding to a path delay or to a signal frequency, to obtain ordered channel measurement samples for a current estimation interval. A wide variety of techniques for performing channel response measurements are known, including techniques based on measuring known pilot symbols, such as the CPICH in 3GPP WCDMA systems. Techniques that rely on measurements of pseudo-pilot symbols or data symbols are also well known. For the purposes of the present discussion, however, the exact technique used to obtain the channel measurements is not important.

As shown at block 120, the method continues with the estimation of a short-term slope value for each of a plurality of sequential observation time intervals, e.g., a slope value for a set of $N_{samples}$ consecutive samples. Each observation time interval comprises a series of the ordered channel measurement samples, having a uniform length. Estimating the short-term slope value for each observation time interval may comprise determining a best-fit line for the ordered channel measurement samples of the observation time interval, using a linear regression model, as discussed above.

Next, as shown at blocks 130 and 140, a distortion metric is calculated for each of a plurality of candidate filter lengths, where each candidate filter length is an integer multiple of the uniform length. In other words, each candidate filter length is made up of an integer number of consecutive observation time intervals. The calculation of the distortion metric is based on the short-term slope values for observation time intervals falling within the candidate filter length, and it characterizes the extent to which the candidate filter length will introduce a tracking bias in filtering the ordered channel measurement samples.

As shown at block 150, a filter length is then selected for use in demodulating a received signal from at least among the candidate filter lengths, based on the distortion metric values.

In short, the longest filter length meeting a pre-determined distortion criterion is selected. In some embodiments, the filter length is selected from among the candidate filter lengths and a default filter length (e.g., a filter length corresponding to $N_{ref}$ samples, as described above), the default filter length being shorter than any of the candidate filter lengths.

As shown in the first of the detailed examples given earlier, in some embodiments the computation of the distortion metric value for each candidate filter length may comprise determining minimum and maximum slope values among the short-term slope values for observation time intervals falling within the candidate filter length and normalizing a difference between the minimum and maximum slope values. In some cases, a distortion metric value p for each candidate filter length is computed according to the formula $$p = \frac{\alpha^{re,max} - \alpha^{re,min} + \alpha^{im,max} - \alpha^{im,min}}{\max(|\alpha^{re,max}|, |\alpha^{re,min}|) + \max(|\alpha^{im,max}|, |\alpha^{im,min}|)},$$

where $\alpha^{re,max}$ and $\alpha^{re,min}$ are the maximum and minimum values of the real part of the short-term slope values, respectively, and $\alpha^{im,max}$ and $\alpha^{im,min}$ are the maximum and minimum values of the imaginary part of the short-term slope values, respectively.

As shown in the second of the detailed examples given earlier, in some embodiments the computation of the distortion metric value for each candidate filter length may instead comprise calculating a variance over the short-term slope values for observation time intervals falling within the candidate filter length. Other techniques for computing a distortion metric that characterizes the extent to which the candidate filter length will introduce a tracking bias in filtering the ordered channel measurement samples are possible.

In some embodiments of the method illustrated in FIG. 1, multiple distortion metric values for each candidate filter length are filtered, to obtain filtered distortion metric values, in which case the selection of the filter length for use in demodulating the received signal is based on the filtered distortion metric values.

In any of the embodiments described above, each of the performing, estimating, computing, and selecting operations may be repeated for each of a series of channel estimation intervals, so that the selected filter is adapted in response to changing channel conditions.

Figure 2:
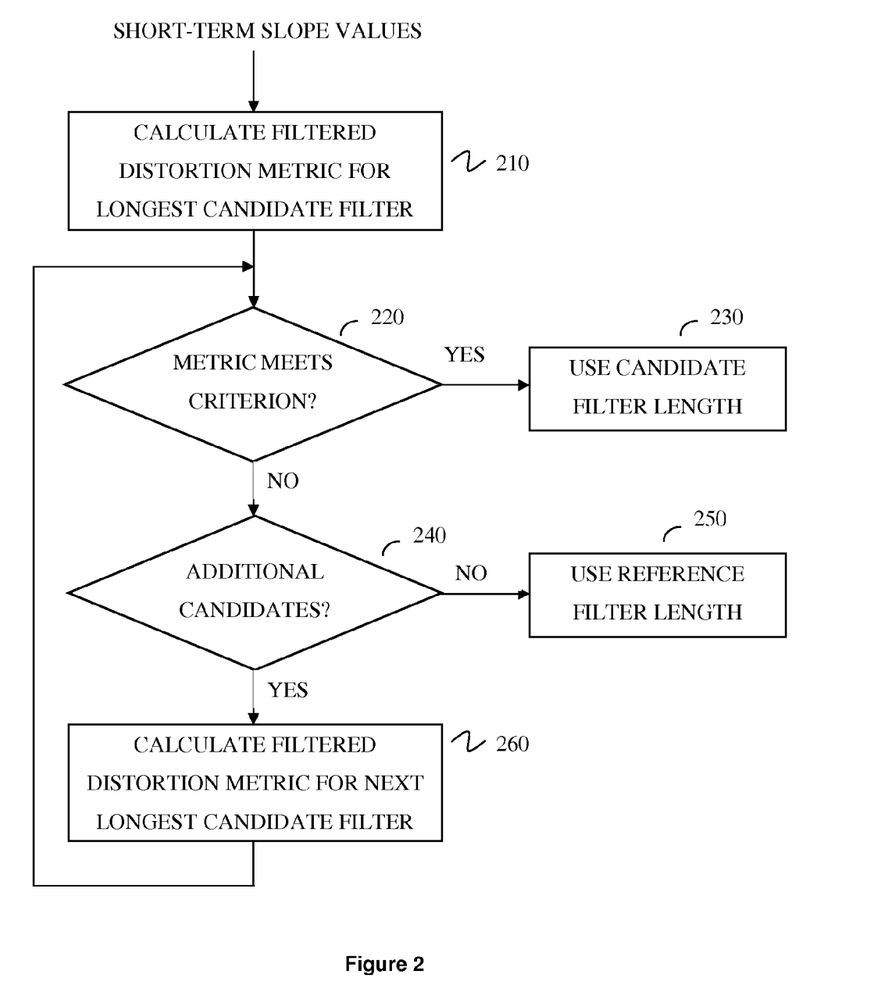
FIG. 2 is another process flow diagram illustrating further details of an example method according to some embodiments of the invention.

FIG. 2 is another process flow diagram illustrating a more detailed example of a process for selecting a filter length based on comparing a filtered distortion metric for each of several candidate filter lengths to a pre-determined distortion metric. The illustrated method begins with a set of short-term slope values that have been estimated for each of several consecutive sequential observation time intervals from ordered channel measurement samples.

As shown at block 210, a filtered distortion metric is calculated for the longest candidate filter, using any of the techniques described above. If this filtered distortion metric meets the pre-determined distortion criterion, as shown at block 220, then the corresponding candidate filter is selected for use in demodulating a received signal, as shown at block 230. Several possibilities for the pre-determined distortion criterion were discussed in the detailed examples provided above; in some embodiments the pre-determined distortion criterion is that the filtered distortion metric does not exceed a pre-determined threshold value, which may in some cases be calculated by scaling the distortion metric corresponding to a reference length, using a scaling factor, which may be adaptable.

Otherwise, i.e., if the filtered distortion metric does not meet the pre-determined distortion criterion, then the method continues with the processing of one or more additional candidates, if any, as shown at block 240. If there are no additional candidates, then the reference filter length is selected for processing the received signal, as shown at block 250. This reference filter length is generally the shortest available filter length, which is selected to produce an acceptable level of tracking bias under the most difficult conditions (e.g., at the highest mobile terminal speeds).

If there is at least one additional candidate, however, the process continues, as shown at block 260, with the calculation of a filtered distortion metric for the next-longest candidate filter. That filtered distortion metric is then evaluated against the pre-determined distortion criterion, as shown at block 220. The process continues until either a candidate filter length meets the criterion and is selected (block 230) or until no further candidates are available and the reference filter length is used (block 250). As in the case of the process illustrated in FIG. 1, the entire process can be repeated for each of a series of channel estimation intervals, so that the selected filter is adapted according to changes in channel conditions.

In any of the embodiments illustrated in FIGS. 1 and/or 2, the selection of the filter length may be based on comparing the filtered distortion metric for the selected candidate filter length to a scaled distortion metric for a predetermined reference filter length. In such cases, for example, the pre-determined distortion criterion may be that the filtered distortion metric is less than or equal to the scaled distortion metric, as illustrated in the detailed examples provided earlier. In some of these embodiments, a scaling factor for the scaled distortion metric may be adapted, based on one or more signal quality measurements. Other criteria, are possible, depending on how the distortion metric is formulated. The parameters of the criteria may be pre-designed using off-line analysis or simulation, for example.

Furthermore, in some of the embodiments described above, the ordered channel measurement samples may be time-ordered channel measurement samples taken over an interval of time. In other embodiments, the ordered channel measurement samples are frequency-ordered channel measurement samples taken across a set of sub-carrier frequencies, such as frequency-ordered samples taken across multiple subcarriers of an Orthogonal Frequency-Division Multiplexing (OFDM) signal in an LTE system. Accordingly, just as no initial Doppler estimate is required to perform an appropriate smoothing of time-ordered channel measurements using the present techniques, no initial channel dispersion estimate is required to smooth frequency-ordered channel measurements. Indeed, it will be appreciated that the applications of these techniques in the time and frequency domains are simply duals of one another.

Figure 3:
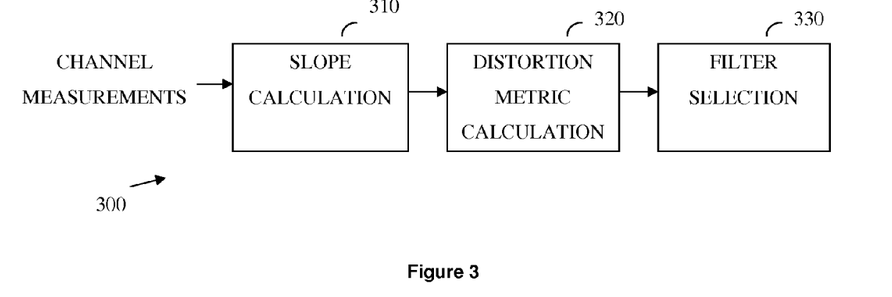
FIG. 3 illustrates functional components of a receiver circuit according to some embodiments of the invention.

The techniques illustrated in FIGS. 1 and 2, and all of the variants discussed above, can be implemented in a communications receiver 300 having the functional components illustrated in FIG. 3. FIG. 3 is a block diagram illustrating functional components of a communications receiver 300 configured to carry out one or more of the techniques described herein. The initial channel measurements are used by slope calculation unit 310 to estimate short-term slope values for sequential observation time intervals. The slope values are used, in turn, by the distortion metric calculation unit 320, which is arranged to compute a distortion metric for each of several candidate filter lengths, the distortion metric value characterizing an extent to which the candidate filter length will introduce a tracking bias in filtering ordered channel measurement samples. Filter selection unit 330 is arranged to select one of the candidate filter lengths for subsequent processing of the received signal, based on the distortion metric values and a pre-determined distortion criterion.

Figure 4:
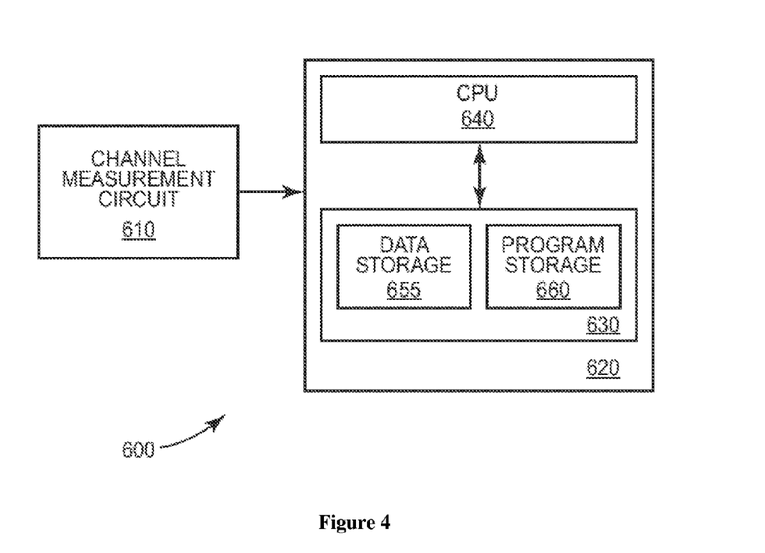
FIG. 4 is a block diagram illustrating components of an example receiver circuit.

FIG. 4 is a block diagram of one example implementation of a receiver circuit 600 configured according to the present invention. It will be appreciated that receiver circuit 600 can likewise be adapted to carry out any of the techniques illustrated in FIGS. 1 and 2 and variants of those techniques.

Receiver circuit 600 includes a channel response measurement circuit 610, which is configured to perform a plurality of channel response measurements corresponding to a path delay or to a signal frequency, to obtain ordered channel measurement samples for a current estimation interval. In general terms, measurement circuit 610 is configured to compare samples derived from the received signal to the known transmitted signal to obtain these channel measurement samples. In some embodiments, measurement circuit 610 comprises one or more receiver "taps," or correlators, which are arranged to despread a received CDMA signal using a known channelization code and/or scrambling code, to obtain despread samples of a pilot signal having known symbol values. The ratio of each despread sample to the corresponding known symbol values represents a channel response measurement.

Receiver circuit 600 further includes a processing circuit 620, which is configured to receive the channel measurements from measurement circuit 610 and to evaluate them according to one or more of the techniques described above to select a smoothing filter response for generating smoothed channel response estimates. Accordingly, processing circuit 620 in some embodiments is configured to: estimate a short-term slope value for each of a plurality of sequential observation time intervals, each observation time interval comprising a plurality of the ordered channel measurement samples and having a uniform length; for each of a plurality of candidate filter lengths, where each candidate filter length is an integer multiple of the uniform length, compute a distortion metric value based on the short-term slope values for observation time intervals falling within the candidate filter length, the distortion metric value characterizing an extent to which the candidate filter length will introduce a tracking bias in filtering the ordered channel measurement samples; and select a filter length for use in demodulating a received signal from at least among the candidate filter lengths, based on the distortion metric values, such that the longest filter length meeting a pre-determined distortion criterion is selected.

Processing circuit 620 includes a central-processing unit (CPU) 640, which may comprise one or more microprocessors, microcontrollers, and/or the like, coupled to memory unit 630. Memory unit 630, which may comprise one or several types of memory such as RAM, ROM, Flash, optical storage devices, magnetic storage devices, and the like, stores computer program instructions 660 for execution by CPU 640, and stores program data 655. Program instructions 660 include instructions for carrying out one or more of the techniques described above. Of course, while the illustrated processing circuit 620 is one example of a processing circuit, the term "processing circuit" should be understood to refer to any suitable combination of digital hardware, microcontrollers, microprocessors, and/or memory.

The techniques and circuits described above and illustrated in FIGS. 1-4 may be used in any number of wireless devices.

Figure 5:
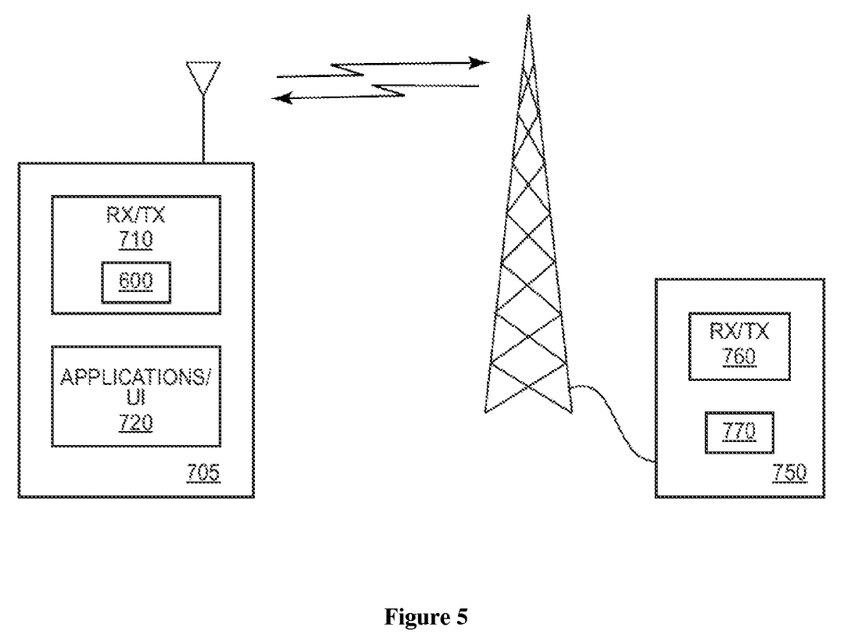
FIG. 5 illustrates a wireless communications system with wireless devices including receiver circuits like those of FIG. 4.

An example application of these techniques and circuits is shown in FIG. 5, which illustrates a wireless device 705 communicating wirelessly with a base station 750, the latter of which includes a transceiver (RX/TX) circuit 760 and a control circuit 770. Wireless device 705, which may be a cellular telephone, wireless PDA, wireless-equipped laptop computer, etc., includes a transceiver (RX/TX) circuit 710 which includes the radio circuits and signal processing circuits necessary to carry out two-way wireless communications with base station 750, typically according to the requirements of one or more wireless telecommunications standards such as the 3GPP standards for WCDMA or LTE. Transceiver circuit 710 in turn includes a receiver circuit 600, as discussed above in the description of FIG. 4. Wireless device 705 further includes an applications/UI circuit 720 for managing user applications and user interface (UI) functionality as applicable.

While FIG. 5 illustrates the use of the inventive techniques described herein in the context of a mobile device, rather than in a fixed base station, it should be appreciated that these techniques may also be used in wireless devices installed in fixed locations, such as in the base station 750 of FIG. 5. While a base station receiver is typically not subject to the same signal processing constraints of a mobile device, a base station performing channel transfer response estimation for signals received from mobile devices is still subject to the tracking bias problems discussed earlier, and may thus benefit from the improved techniques for obtaining smoothed channel responses described herein. Likewise, wireless devices in peer-to-peer or ad-hoc wireless networks may also benefit from these techniques.

The foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

With these and other variations and extensions in mind, those skilled in the art will appreciate that the foregoing description and the accompanying drawings represent non-limiting examples of the systems and apparatus taught herein for obtaining smoothed channel response estimates in a communications receiver. As such, the present invention is not limited by the foregoing description and accompanying drawings. Instead, the present invention is limited only by the following claims and their legal equivalents.

What is claimed is:

1. A method, in a communications receiver, for obtaining smoothed channel response estimates, the method comprising:

performing multiple channel response measurements corresponding to a path delay or to a signal frequency, to obtain ordered channel measurement samples for a current estimation interval;

estimating a short-term slope value for each of a plurality of sequential observation time intervals, each observation time interval comprising a plurality of the ordered channel measurement samples and having a uniform length;

for each of a plurality of candidate filter lengths, where each candidate filter length is an integer multiple of the uniform length, computing a distortion metric value based on the short-term slope values for observation time intervals falling within the candidate filter length, the distortion metric value characterizing an extent to which the candidate filter length will introduce a tracking bias in filtering the ordered channel measurement samples; and selecting a filter length for use in demodulating a received signal from at least among the candidate filter lengths, based on the distortion metric values, such that the longest filter length meeting a pre-determined distortion criterion is selected.

2. The method of claim 1, wherein selecting the filter length from at least among the candidate filter lengths comprises selecting the filter length from among the candidate filter lengths and a default filter length, said default filter length being shorter than any of the candidate filter lengths.

3. The method of claim 1, wherein estimating a short-term slope value comprises determining a best-fit line for the ordered channel measurement samples of the observation time interval, using a linear regression model.

4. The method of claim 1, wherein computing the distortion metric value for each candidate filter length comprises determining minimum and maximum slope values among the short-term slope values for observation time intervals falling within the candidate filter length and normalizing a difference between the minimum and maximum slope values.

5. The method of claim 1, wherein computing the distortion metric value for each candidate filter length comprises calculating a variance over the short-term slope values for observation time intervals falling within the candidate filter length.

6. The method of claim 1, further comprising filtering multiple distortion metric values for each candidate filter length to obtain filtered distortion metric values, wherein said selecting the filter length is based on the filtered distortion metric values.

7. The method of claim 1, wherein the ordered channel measurement samples are time-ordered channel measurement samples taken over an interval of time.

8. The method of claim 1, wherein the ordered channel measurement samples are frequency-ordered channel measurement samples taken across a set of sub-carrier frequencies.

9. The method of claim 1, further comprising repeating each of the performing, estimating, computing, and selecting operations for each of a series of channel estimation intervals.

10. The method of claim 4, wherein the distortion metric value p for each candidate filter length is computed according to the formula $$p = \frac{\alpha^{re,max} - \alpha^{re,min} + \alpha^{im,max} - \alpha^{im,min}}{\max(|\alpha^{re,max}|, |\alpha^{re,min}|) + \max(|\alpha^{im,max}|, |\alpha^{im,min}|)},$$

where $\alpha^{re,max}$ and $\alpha^{re,min}$ are the maximum and minimum values of the real part of the short-term slope values, respectively, and $\alpha^{im,max}$ and $\alpha^{im,min}$ are the maximum and minimum values of the imaginary part of the short-term slope values, respectively.

11. The method of claim 6, wherein selecting the filter length from at least among the candidate filter lengths comprises comparing the filtered distortion metric for the selected candidate filter length to a scaled distortion metric for a pre-determined reference filter length.

12. The method of claim 11, wherein said pre-determined distortion criterion is that the filtered distortion metric is less than or equal to the scaled distortion metric.

13. The method of claim 11, further comprising adapting a scaling factor for the scaled distortion metric based on one or more signal quality measurements.

14. A receiver circuit comprising
a channel response measurement circuit configured to perform a plurality of channel response measurements corresponding to a path delay or to a signal frequency, to obtain ordered channel measurement samples for a current estimation interval, and
a processing circuit configured to:
estimate a short-term slope value for each of a plurality of sequential observation time intervals, each observation time interval comprising a plurality of the ordered channel measurement samples and having a uniform length;
for each of a plurality of candidate filter lengths, where each candidate filter length is an integer multiple of the uniform length, compute a distortion metric value based on the short-term slope values for observation time intervals falling within the candidate filter length, the distortion metric value characterizing an extent to which the candidate filter length will introduce a tracking bias in filtering the ordered channel measurement samples; and
select a filter length for use in demodulating a received signal from at least among the candidate filter lengths, based on the distortion metric values, such that the longest filter length meeting a pre-determined distortion criterion is selected.

15. The receiver circuit of claim 14, wherein the processing circuit is configured to select the filter length from at least among the candidate filter lengths by selecting the filter length from among the candidate filter lengths and a default filter length, said default filter length being shorter than any of the candidate filter lengths.

16. The receiver circuit of claim 14, wherein the processing circuit is configured to estimate short-term slope values by determining best-fit lines for the ordered channel measurement samples of the observation time interval, using a linear regression model.

17. The receiver circuit of claim 14, wherein the processing circuit is configured to compute the distortion metric value for each candidate filter length by determining minimum and maximum slope values among the short-term slope values for observation time intervals falling within the candidate filter length and normalizing a difference between the minimum and maximum slope values.

18. The receiver circuit of claim 14, wherein the processing circuit is configured to compute the distortion metric value for each candidate filter length by calculating a variance over the short-term slope values for observation time intervals falling within the candidate filter length.

19. The receiver circuit of claim 14, wherein the processing circuit is further configured to filter multiple distortion metric values for each candidate filter length to obtain filtered distortion metric values, and to select the filter length based on the filtered distortion metric values.

20. The receiver circuit of claim 14, wherein the ordered channel measurement samples are time-ordered channel measurement samples taken over an interval of time.

21. The receiver circuit of claim 14, wherein the ordered channel measurement samples are frequency-ordered channel measurement samples taken across a set of sub-carrier frequencies.

22. The receiver circuit of claim 14, wherein the receiver circuit is further configured to repeat each of the performing, estimating, computing, and selecting operations for each of a series of channel estimation intervals.

23. A wireless device comprising the receiver circuit of claim 14.

24. The receiver circuit of claim 17, wherein the processing circuit is configured to compute the distortion metric value p for each candidate filter length according to the formula $$p = \frac{\alpha^{re,max} - \alpha^{re,min} + \alpha^{im,max} - \alpha^{im,min}}{\max(|\alpha^{re,max}|, |\alpha^{re,min}|) + \max(|\alpha^{im,max}|, |\alpha^{im,min}|)},$$

where $\alpha^{re,max}$ and $\alpha^{re,min}$ are the maximum and minimum values of the real part of the short-term slope values, respectively, and $\alpha^{im,max}$ and $\alpha^{im,min}$ are the maximum and minimum values of the imaginary part of the short-term slope values, respectively.

25. The receiver circuit of claim 19, wherein the processing circuit is configured to select the filter length from at least among the candidate filter lengths by comparing the filtered distortion metric for the selected candidate filter length to a scaled distortion metric for a pre-determined reference filter length.

26. The receiver circuit of claim 25, wherein said pre-determined distortion criterion is that the filtered distortion metric is less than or equal to the scaled distortion metric.

27. The receiver circuit of claim 26, wherein the processing circuit is further configured to adapt a scaling factor for the scaled distortion metric based on one or more signal quality measurements.

* * * * *

UNITED STATES PATENT AND TRADEMARK OFFICE
CERTIFICATE OF CORRECTION

PATENT NO. : 8,737,550 B1  
APPLICATION NO. : 13/693561  
DATED : May 27, 2014  
INVENTOR(S) : Jonsson et al.

Page 1 of 1

It is certified that error appears in the above-identified patent and that said Letters Patent is hereby corrected as shown below:

In the Specification

In Column 8, Line 42, delete "$\rho_{1,raw}^{(max,min)}$" and insert -- $\rho_{1,raw}^{(max/min)}$ --, therefor.

Signed and Sealed this
Twentieth Day of January, 2015

Michelle K. Lee
*Deputy Director of the United States Patent and Trademark Office*